United States Patent
Morgana et al.

(10) Patent No.: US 8,606,795 B2
(45) Date of Patent: Dec. 10, 2013

(54) FREQUENCY BASED KEYWORD EXTRACTION METHOD AND SYSTEM USING A STATISTICAL MEASURE

(75) Inventors: Stephen C. Morgana, Rochester, NY (US); John C. Handley, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1142 days.

(21) Appl. No.: 12/165,962

(22) Filed: Jul. 1, 2008

(65) Prior Publication Data

US 2010/0005083 A1    Jan. 7, 2010

(51) Int. Cl.
G06F 7/00 (2006.01)
G06F 17/30 (2006.01)

(52) U.S. Cl.
USPC ........................................................ 707/750

(58) Field of Classification Search
USPC .......................................... 707/999.006, 750
See application file for complete search history.

(56) References Cited

U.S. PATENT DOCUMENTS

| 5,642,518 | A | 6/1997 | Kiyama et al. | 395/757 |
| 6,173,251 | B1 | 1/2001 | Ito et al. | 704/7 |
| 6,470,307 | B1 | 10/2002 | Turney | 704/9 |
| 6,473,753 | B1 * | 10/2002 | Katariya et al. | 1/1 |

* cited by examiner

Primary Examiner — Alexey Shmatov
(74) Attorney, Agent, or Firm — Kermit D. Lopez; Luis M. Ortiz; Ortiz & Lopez, PLLC

(57) ABSTRACT

Frequency based keyword extraction method and system utilizing a statistical measure is disclosed which generates keywords within a page and/or document that can distinguish the document from an average document. A simple frequency threshold parameter can be utilized to determine a number of common stop words if a word in the document possesses a frequency in a corpus that is more than the threshold parameter. A statistical confidence interval of the frequency in the document can be compared against a frequency confidence interval of the word in the corpus. The extracted keyword possesses a greater intra-document frequency confidence interval than the frequency confidence interval of the word within the corpus. A statistical hypothesis test can also be utilized to determine the keyword by calculating a test statistic and testing whether the test statistic is greater than some threshold.

5 Claims, 5 Drawing Sheets

Go visit the Prairies in June, when for scores on scores of miles you wade knee-deep among Tiger-lilieswhat is the one charm wanting? --Water --there is not a drop of water there! Were Niagara but a cataract of sand, would you travel your thousand miles to see it? Why did the poor poet of Tennessee, upon suddenly receiving two handfuls of silver, deliberate whether to buy him a coat, which he sadly needed, or invest his money in a pedestrian trip to Rockaway Beach? Why is almost every robust healthy boy with a robust healthy soul in him, at some time or other crazy to go to sea? Why upon your first voyage as a passenger, did you yourself feel such a mystical vibration, when first told that you and your ship were now out of sight of land? Why did the old Persians hold the sea holy? Why did the Greeks give it a separate deity, and own brother of Jove? Surely all this is not without meaning. And still deeper the meaning of that story of Narcissus, who because he could not grasp the tormenting, mild image he saw in the fountain, plunged into it and was drowned. But that same image, we ourselves see in all rivers and oceans. It is the image of the ungraspable phantom of life; and this is the key to it all. Now, when I say that I am in the habit of going to sea whenever I begin to grow hazy about the eyes, and begin to be over conscious of my lungs, I do not mean to have it inferred that I ever go to sea as a passenger. For to go as a passenger you must needs have a purse, and a purse is but a rag unless you have something in it. Besides, passengers get sea-sick --grow quarrelsome --don't sleep of nights --do not enjoy themselves much, as a general thing; --no, I never go as a passenger; nor, though I am something of a salt, do I ever go to sea as a Commodore, or a Captain, or a Cook. I abandon the glory and distinction of such offices to those who like them. For my part, I abominate all honorable respectable toils, trials, and tribulations of every kind whatsoever. It is quite as much as I can do to take care of myself, without taking care of ships, barques, brigs, schooners, and what not. And as for going as cook, -- though I confess there is considerable glory in that, a cook being a sort of officer on ship-board -- yet, somehow, I never fancied broiling fowls; --though once broiled, judiciously buttered, and judgmatically salted and peppered, there is no one who will speak more respectfully, not to say reverentially, of a broiled fowl than I will. It is out of the idolatrous dotings of the old Egyptians upon broiled ibis and roasted river horse, that you see the mummies of those creatures in their huge bake-houses the pyramids. No, when I go to sea, I go as a simple sailor, right before the mast, plumb down into the forecastle, aloft there to the royal mast-head. True, they rather order me about some, and make me jump from spar to spar, like a grasshopper in a May meadow. And at first, this sort of thing is unpleasant enough. It touches one's sense of honor, particularly if you come of an old established family in the land, the van Rensselaers, or Randolphs, or Hardicanutes. And more than all, if just previous to putting your hand into the tar-pot, you have been lording it as a country schoolmaster, making the tallest boys stand in awe of you. The transition is a keen one, I assure you, from the schoolmaster to a sailor, and requires a strong decoction of Seneca and the Stoics to enable you to grin and bear it. But even this wears off in time. What of it, if some old hunks of a sea-captain orders me to get a broom and sweep down the decks? What does that indignity amount to, weighed, I mean, in the scales of the New Testament? Do you think the archangel Gabriel thinks anything the less of me, because I promptly and respectfully obey that old hunks in that particular instance? Who aint a slave? Tell me that. Well, then, however the old sea-captains may order me about--however they may thump and punch me about, I have the satisfaction of knowing that it is all right; that everybody else is one way or other served in much the same way -- either in a physical or metaphysical point of view, that is; and so the universal thump is passed round, and all hands should rub each other's shoulder-blades, and be content.

*FIG. 6*

FREQUENCY BASED KEYWORD EXTRACTION METHOD AND SYSTEM USING A STATISTICAL MEASURE

TECHNICAL FIELD

Embodiments are generally related to data-processing systems and methods. Embodiments are additionally related to the field of computers and similar technologies, and in particular to software utilized in this field. Embodiments are also related to keyword extraction methods and systems.

BACKGROUND OF THE INVENTION

A keyword is a single word or multiple-words present within documents that can characterize and summarize the topics covered by the documents. Generally, when documents are prepared, there is often a need to generate a list of keywords and phrases that represent the main concepts described in such documents. For example, a reader may utilize a list of keywords and phrases as a simple summary of a document for searching and locating articles in academic documents such as technical papers, journal articles etc. Similarly, due to an increase in the usage of the well-known Internet, there is a need to provide a keyword list of electronic documents to facilitate searching for a particular document. Keyword extraction from a document possesses many potential applications, such as the creation of metadata for a document, facilitating skimming documents by highlighting keywords, and use used in the context of index terms for searching document collections, and also for analyzing usage patterns in Web server logs.

Keywords from a document can be generated manually by an author of the document or a person skilled in indexing documents. The keywords may also be generated automatically by tagging words in documents by their part-of-speech, such as for example a noun, a verb, an adjective, etc. Similarly, the most frequent words in documents can be listed, excluding stop words such as "and" "if" "have" etc. Stop words are commonly utilized insignificant words such as "the" which occurs frequently in a document. Such prior art keyword extraction methods possess limited capabilities, which results in a relatively low-quality list of keywords. Such approaches are also usually highly labor intensive.

One prior art keyword extraction approach collects word frequencies with respect to a corpus of documents to determine average word frequencies. The same frequency counting method can be utilized to determine the word frequencies of a page or a document in question. The problem associated with such prior art approaches is that common words may occur more frequently in a given page or document than in the corpus, and may be incorrectly output as keywords. Similarly, if the given page possesses a small word count, quantization causes the word frequencies to be inaccurate, thereby resulting in non-keywords appearing more frequent than in the corpus. One solution to this problem is to utilize a list of stop words composed of a predetermined set of common words. Hence, if a given word in the page or document is a stop word, it is not considered a keyword. Similarly, the raw frequency in the given page or document can be compared against the raw frequency in the corpus to generate keywords. Such methods, however, generate frequency quantization problems due to small sample sizes.

Based on the foregoing it is believed that a need exists for an improved automated method and system for simple keyword extraction, as described in greater detail herein.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved data-processing method, system and computer-usable medium.

It is another aspect of the present invention to provide for an improved method and system for automatically extracting keywords from a document to avoid frequency quantization problems.

It is further aspect of the present invention to provide for an improved method for extracting keywords from a document utilizing a statistical measure.

The aforementioned aspects and other objectives and advantages can now be achieved as described herein. Frequency based keyword extraction method and system utilizing a statistical measure is disclosed which generates keywords within a page and/or document that distinguish the document from an average document. A simple frequency threshold parameter can be utilized to determine a number of common stop words if a word in the document possesses a frequency in a corpus that is more than the threshold parameter. A statistical confidence interval of the frequency of a word in the document can be compared against a frequency confidence interval of the word in the corpus. The extracted keyword possesses a greater intra-document frequency confidence interval than the frequency confidence interval of the word within the corpus. A statistical hypothesis test can also be utilized to determine the keyword by calculating a test statistic and testing whether the test statistic is greater than some threshold. The test statistic possesses an approximate normal distribution function.

The confidence intervals can be utilized to avoid frequency quantization problems caused by small sample sizes. Furthermore, the lower bound of the frequency confidence interval in the document must be greater than the upper bound of the frequency confidence interval in the corpus in order to generate keywords. The confidence interval utilized for the word in the document does not need to be the same as the interval utilized for the words in the corpus. The keywords produced are those words that are stressed more than in the average document. Such a method can be utilized for keyword extraction or utilized as an input to a more elaborate keyword extraction scheme.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 6 illustrates an exemplary page of a document with extracted keywords, in accordance with a preferred embodiment.

DETAILED DESCRIPTION

The particular values and configurations discussed in these non-limiting examples can be varied and are cited merely to illustrate at least one embodiment and are not intended to limit the scope of such embodiments.

Figure 1:
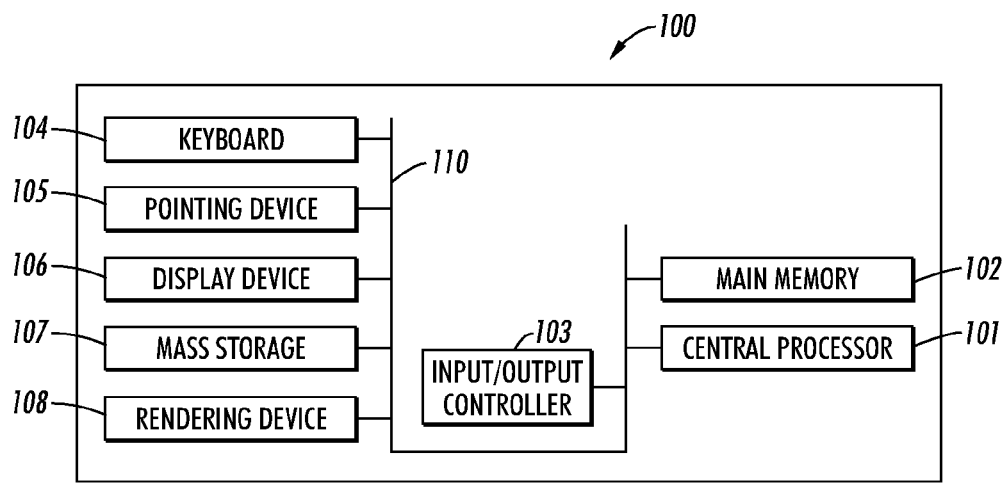
FIG. 1 illustrates a schematic view of a computer system in which the present invention may be embodied.

As depicted in FIG. 1, the present invention may be embodied in the context of a data-processing apparatus 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a rendering device 108, may be included in the data-processing apparatus 100 as desired. As illustrated, the various components of the data-processing apparatus 100 communicate through a system bus 110 or similar architecture. Note that rendering device 108 may constitute, for example, a printer, a copier, fax machine, scanner, and/or other types of rendering components, depending upon design considerations. The main memory 102 also can include keyword extractor module 154, to extract keywords from documents. Such media software is accessible by central processor 101 and can be run and/or processed via such a processor.

Figure 2:
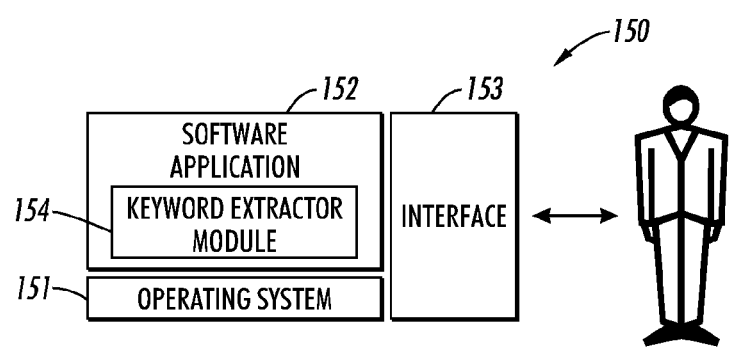
FIG. 2 illustrates a schematic view of a software system including an operating system, application software, and a user interface, which can be adapted for use in carrying out an embodiment of the present invention.

Illustrated in FIG. 2, a computer software system 150 is provided for directing the operation of the data-processing apparatus 100. Software system 150, which is stored in system memory 102 and on disk memory 107, includes a kernel or operating system 151 and a shell or interface 153. One or more application programs, such as application software 152, may be "loaded" (i.e., transferred from storage 107 into memory 102) for execution by the data-processing apparatus 100. The application software 152 may include a keyword extractor module 154 stored in the main memory for extracting keywords from documents. The data-processing apparatus 100 receives user commands and data through user interface 153; these inputs may then be acted upon by the data-processing apparatus 100 in accordance with instructions from operating module 151 and/or application module 152. The interface 153, which is preferably a graphical user interface (GUI), also serves to display results, whereupon the user may supply additional inputs or terminate the session. In an embodiment, operating system 151 and interface 153 can be implemented in the context of a "Windows" system.

Figure 3:
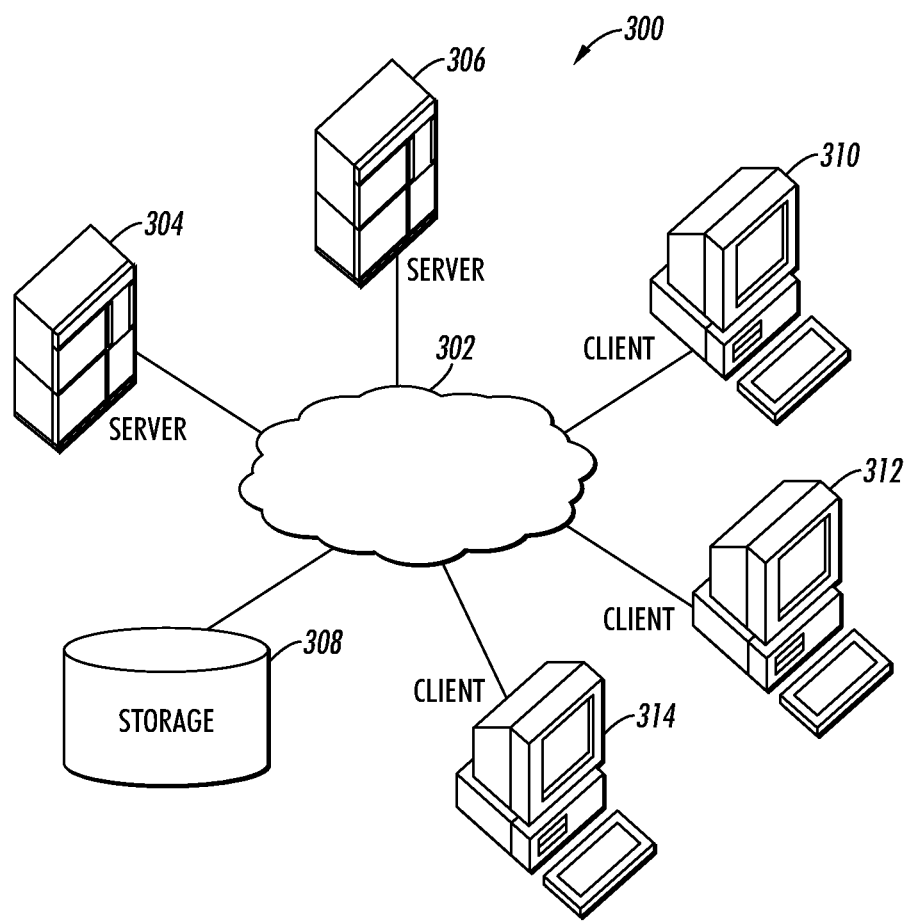
FIG. 3 depicts a graphical representation of a network of data-processing systems in which aspects of the present invention may be implemented.

FIG. 3 depicts a graphical representation of a network of data processing systems in which aspects of the present invention may be implemented. Note that in FIGS. 1-3, identical or similar parts are generally indicated by identical reference numerals. Network data processing system 300 is a network of computers in which embodiments of the present invention may be implemented. Network data processing system 300 contains network 302, which is the medium used to provide communications links between various devices and computers connected together within network data processing apparatus 100. Network 102 may include connections, such as wire, wireless communication links, or fiber optic cables.

In the depicted example, server 304 and server 306 connect to network 302 along with storage unit 308. In addition, clients 310, 312, and 314 connect to network 302. These clients 310, 312, and 314 may be, for example, personal computers or network computers. Data-processing apparatus 100 depicted in FIG. 1 can be, for example, a client such as client 310, 312, and/or 314. Alternatively, data-processing apparatus 100 can be implemented as a server, such as servers 304 and/or 306, depending upon design considerations.

In the depicted example, server 304 provides data, such as boot files, operating system images, and applications to clients 310, 312, and 314. Clients 310, 312, and 314 are clients to server 304 in this example. Network data processing system 300 may include additional servers, clients, and other devices not shown. Specifically, clients may connect to any member of a network of servers which provide equivalent content.

In the depicted example, network data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. The keyword can be generated for a list of electronic documents to facilitate searching for a document. Of course, network data processing system 300 also may be implemented as a number of different types of networks, such as for example, an intranet, a local area network (LAN), or a wide area network (WAN). FIG. 1 is intended as an example, and not as an architectural limitation for different embodiments of the present invention.

The following description is presented with respect to embodiments of the present invention, which can be embodied in the context of a data-processing system such as data-processing apparatus 100, computer software system 150 and data processing system 300 and network 302 depicted respectively FIGS. 1-3. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

Figure 4:
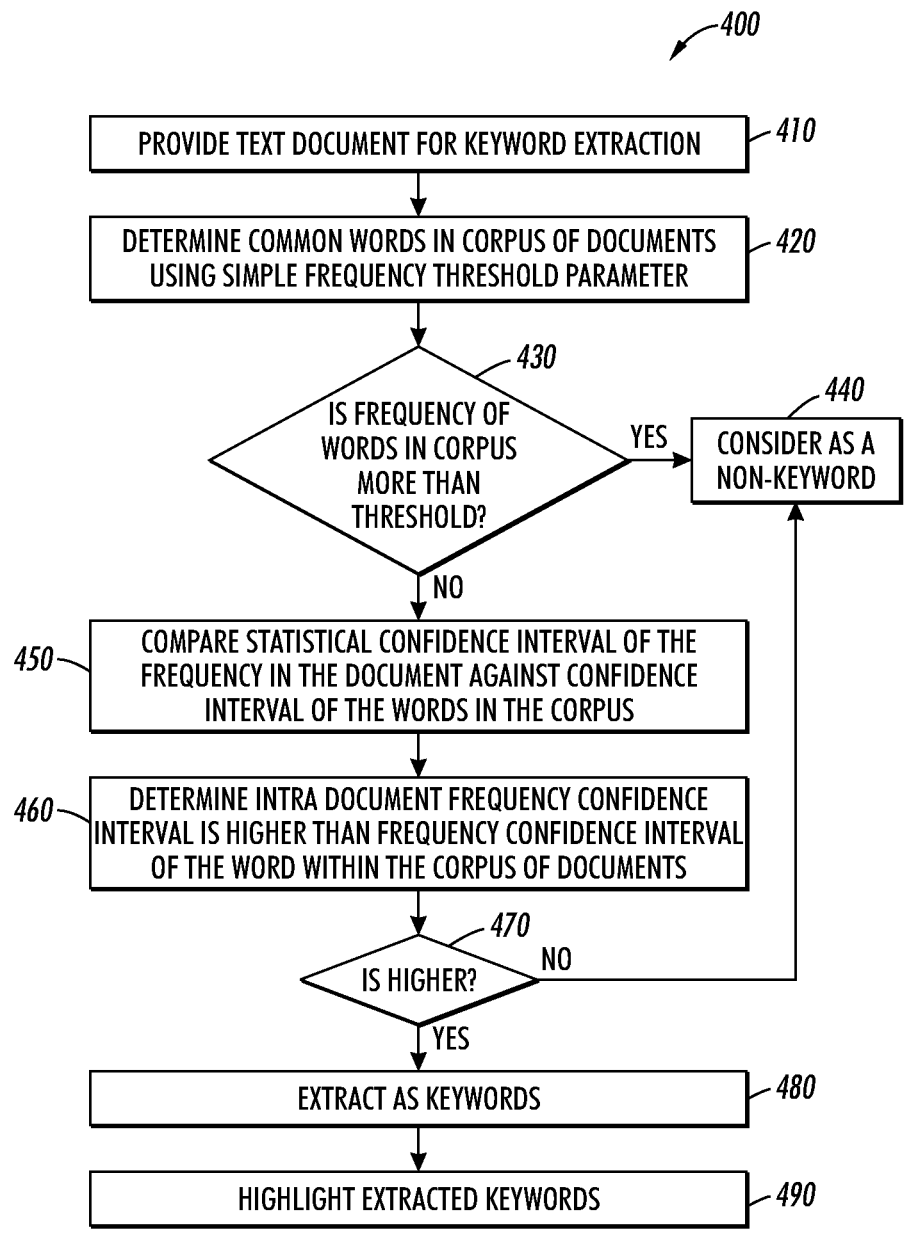
FIG. 4 illustrates a detailed flow chart of operations illustrating logical operational steps of a method for automatically extracting keywords utilizing a statistical measure, which can be implemented in accordance with a preferred embodiment.

Referring to FIG. 4, a detailed flow chart of operations illustrating logical operational steps of a method 400 for automatically extracting keywords utilizing a statistical measure is illustrated, in accordance with a preferred embodiment. A text document can be provided for keyword extraction, as shown at block 410. A set of common words in a corpus of the document can be determined utilizing a simple frequency threshold parameter, as depicted at block 420. The frequency of the word can be determined as the count of the word divided by the count of words in the document and/or the corpus. A determination can be made whether the words in the document possess a frequency in the corpus that is more than the threshold, as illustrated at block 430. If the frequency in the corpus is more than the threshold the word is considered as stop word and cannot be utilized further for keyword extraction, as shown at block 440. The operation depicted at block 440 generally functions as the destination for stop words and non-keywords. Thereafter, a statistical confidence interval of the frequency in the page or document can be compared against the frequency confidence interval of the words in the corpus, as shown at block 450.

A determination can be made whether the intra-document frequency confidence interval is greater than the frequency confidence interval of the word within the corpus of documents, as depicted at block 460. If the frequency confidence interval of the word within the corpus of documents is lower the word is not considered further for keyword extraction, as shown at block 440. The lower bound of the frequency confidence interval in the page or document must be greater than the upper bound of the frequency confidence interval in the corpus. Any confidence interval can be utilized and the interval utilized for the word in the document does not need to be the same as the interval utilized for words in the corpus. For example, 95% confidence can be utilized for both intervals. Reducing the confidence interval for the word in the page leads to more words becoming keywords, at the expense of false detection and increasing the confidence leads to less keyword at the potential expense of missing actual keywords. Thereafter, the keywords can be extracted and highlighted, as shown at block 480 and 490.

Figure 5:
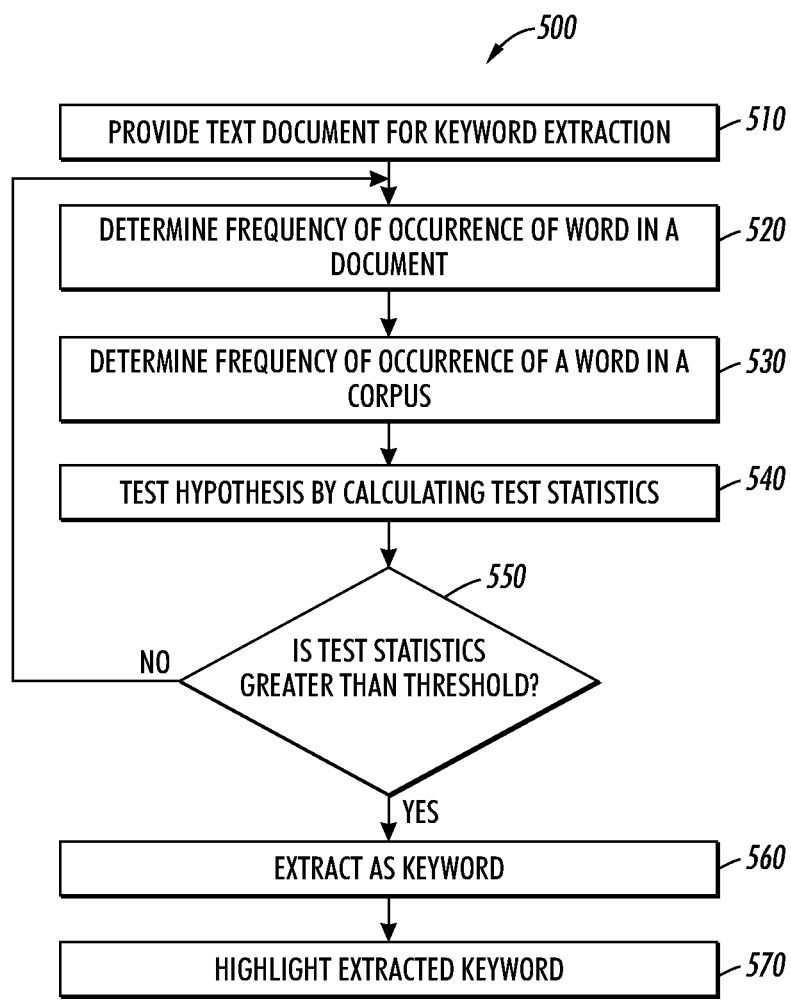
FIG. 5 illustrates a detailed flow chart of operations illustrating logical operational steps of a method for automatically extracting simple keywords utilizing a statistical hypothesis test, which can be implemented in accordance with an alternative embodiment.

FIG. 5 illustrates a detailed flow chart of operations illustrating logical operational steps of a method 500 for automatically extracting simple keywords utilizing a statistical hypothesis test, which can be implemented in accordance with an alternative embodiment. A text document can be provided for keyword extraction, as shown at block 510. Let x be the number of occurrences of a word in a document with m words. The frequency of the word in the document can be determined as the count of the word in the document divided by the total count of words in the document, as depicted at block 520. The calculated frequency for the word in the document can be expressed as indicated in equation (1) as follows.

$$p = x/m \quad (1)$$

Consider y as the number of occurrences of the same word in a corpus without the document with n words. The frequency of the word in the corpus can be determined as the count of the word in the corpus divided by the count of words in the corpus, as depicted at block 530. The calculated frequency for the word in the corpus can be expressed, for example, as equation (2) below.

$$q = y/n \quad (2)$$

A hypothesis can be tested by calculating test statistics, as illustrated at block 540. The word is a significant keyword for a document if its frequency of occurrence in the document is statistically greater than its occurrence in the corpus. This can be determined by a statistical hypothesis test. Such a hypothesis generally includes a null hypothesis with respect to the document frequency of the word less than or equal to the corpus frequency of the term. The alternative hypothesis is that the document frequency of the term is greater than the corpus frequency of the term. The null hypothesis and the alternative hypothesis can be expressed, for example, as indicated by equation (3) and equation (4) respectively.

$$H0: p \leq q \quad (3)$$

$$Ha: p > q \quad (4)$$

Consider $r = (x+y)/(m+n)$. The test statistic possesses an approximate normal distribution and the test statistic can be written as indicated, for example, in equation (5) below:

$$z(p-q)/sqrtr*(1-r)*(1/m+1/n)) \quad (5)$$

A determination can be made whether the test statistics is greater than a threshold, as illustrated at block 550. If the test statistics is greater than the threshold the word is considered as a keyword, as depicted at block 560. Otherwise, the word is not considered further for keyword extraction. For example, the hypothesis H0 can be rejected and the word can be considered as a keyword for the document if $N(z) > 0.05$, where $N(z)$ is the probability that a standard normal random variable with mean 0 and standard deviation 1 which is greater than or equal to z. The "alpha" value 0.05 can be chosen larger in order to allow more words or can be set to be more conservative and allow fewer words. Thereafter, the extracted keyword can be highlighted, as shown at block 570.

FIG. 6 illustrates an exemplary page 600 of a document with keywords, in accordance with a preferred embodiment. The exemplary page 600 of the document illustrates extracted keywords flagged in boldface, as shown in FIG. 6. The keywords extracted are "why", "go" and "sea". The keywords are extracted utilizing simple frequency threshold parameter and frequency confidence interval, as illustrated in FIG. 4. The keywords highlighted in the page 600 pertain directly to the meaning of the passage.

The particular set of words points out the importance of not using a fixed set of stop words to prevent common words as keywords. The words "why" and "go" can generally be stop words, but they fall below the set threshold for corpus common words and they occur in greater frequency in the passage than in the corpus making them as keywords. The keywords produced are those that distinguish the document from the average document and are stressed more than in the average document. The keyword extraction method 400 and 500 can be utilized on its own as a form of keyword extraction or utilized as input to a more elaborate keyword extraction scheme. Such an approach allows stop words to be flagged as keywords if they appear more often than average.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A frequency based keyword extraction method utilizing a statistical measure, comprising:

for at least one word in a document wherein said document comprises at least one keyword, computing a document frequency function of a number of times said at least one word occurs in said document wherein said document frequency is defined as a count of said word in said document divided by a count of a total number of words in said document;

calculating an intra-document frequency confidence interval based on said document frequency;

for said at least one word, computing a corpus frequency function representing a number of times said at least one word occurs in a corpus of documents excluding said document wherein said corpus frequency is defined as a count of said word in said corpus of documents divided by a count of total number of words in said corpus of documents;

calculating a corpus frequency confidence interval based on said corpus frequency;

identifying at least one common stop word according to a frequency threshold parameter;

excluding said at least one common stop word; and thereafter testing a hypothesis by comparing a test statistic represented by said intra-document frequency confidence interval with a test statistic represented by said corpus frequency confidence interval, wherein a lower bound of said intra-document confidence interval is required to be greater than an upper bound of said corpus frequency confidence interval in order to thereby extract said at least one keyword from said document.

2. The method of claim 1 further comprising generating a simple frequency threshold parameter to determine at least one common word in said corpus of documents.

3. The method of claim 1 further comprising visibly highlighting at least one word identified as a keyword in said document.

4. The method of claim 1 wherein said function comprises a frequency and said comparison comprises a statistical measure of a difference in frequencies.

5. The method of claim 1 wherein said at least one keyword distinguishes said document from an average document.

* * * * *